3,029,293
PHENOL PURIFICATION

Joseph R. Nixon, Jr., Pitman, N.J., assignor to Hercules Powder Company, Wilmington, Del., a corporation of Delaware
No Drawing. Filed Aug. 19, 1960, Ser. No. 50,581
8 Claims. (Cl. 260—621)

This invention relates to the purification of phenol, and more particularly to the purification of phenol obtained by oxidation of cumene and subsequent cleavage of the hydroperoxide produced.

When cumene hydroperoxide is cleaved by contacting it with acidic catalysts such as sulfuric acid and acid-treated clays, the cleavage mixture contains phenol and acetone as the principal products. However, the mixture also contains $\alpha$-methylstyrene, acetophenone, dimethylphenylcarbinol and cumylphenol as by-products, and it may contain some unreacted cumene.

The components of the cleavage mixture are preferably recovered therefrom by fractional distillation. Fundamentally, the distillation results in obtaining an acetone fraction, a phenol fraction and a residue comprising cumylphenol. In more detail, the distillation may be carried out to obtain a first fraction comprising acetone, a second fraction comprising $\alpha$-methylstyrene, any unreacted cumene, if present, and water, a third fraction comprising phenol, and a residue comprising acetophenone, dimethylphenylcarbinol, cumylphenol and some resinous matter formed by polymerization of $\alpha$-methylstyrene. Alternatively, the cumene and $\alpha$-methylstyrene may be collected with the acetone fraction or the phenol fraction and separated therefrom by subsequent distillation. In any event, the phenol fraction is a crude phenol which must be subjected to further distillation for purification purposes.

The distillation procedures described above may be operated batchwise, but are more conveniently carried out on a continuous basis in a series of columns, the various fractions being obtained as overhead materials. The crude phenol fraction so obtained may then be distilled either continuously or in a batchwise operation to purify it. When operating batchwise, the crude phenol is stored and periodically removed from the storage tank for charging to the batch still.

Early in the development of suitable distillation techniques for the isolation of pure phenol from cumene hydroperoxide cleavage mixtures it was found that the product phenol, although otherwise pure and meeting standard specifications, contained certain genetic impurities which were usually present in only minute amounts, but which were of such a nature that the phenol containing them developed an undesired red color when subjected to chlorination with elementary chlorine and also developed an unwanted reddish amber color when sulfonated with concentrated sulfuric acid. These impurities obviously were not separable from the phenol by ordinary fractional distillation, and their presence effectively prevented complete purification of the phenol by this procedure alone.

In copending application Serial No. 50,579, filed August 19, 1960, there is a description of the nature of the genetic impurities and of one process of purifying phenol containing such impurities. The impurities include mesityl oxide, an alkyl-substituted benzofuran, and one or more of the precursors of the alkyl-substituted benzofurans. These precursors are $\alpha$-diketones, such as biacetyl, the partial hydrogenation products of $\alpha$-diketones, such as acetoin formed by reduction of one of the keto groups in biacetyl, and the partial hydrogenation products of $\alpha$-ketoaldehydes, such as hydroxyacetone formed by reduction of the aldehyde group in methylglyoxal.

The process of the aforementioned copending application involves the use of certain specific catalysts to promote reaction between phenol and the alkyl-substituted benzofuran precursors and the step of efficient fractional steam distillation to remove the total alkyl-substituted benzofuran content. The present process is similar, but is based on the discovery of the unexpected utility of a small group of catalysts which are unrelated to those of the other application.

The process of the present invention is an improvement in the method for recovering phenol by fractional distillation from the mixture produced by cleavage of cumene hydroperoxide, which mixture comprises phenol and acetone as principal components. The improvement comprises the steps of subjecting a cumene hydroperoxide cleavage mixture, from which the acidic catalyst has been substantially removed, as by neutralization or extraction, to fractional distillation to remove acetone and then contacting in the liquid phase any substantially acetone-free, predominantly phenol-containing material, which material contains genetic impurities comprising mesityl oxide, an alkyl-substituted benzofuran and at least one precursor of said alkyl-substituted benzofuran, under acidic conditions with an acidic catalyst selected from the group consisting of the halides, sulfates and nitrates of copper, chromium and mercury, at a temperature in the range of about 45° to about 200° C., fractionally steam distilling the treated phenol-containing material, and subsequently collecting a purified phenol-containing material, preferably by fractionally distilling in the absence of water.

In other words, the improvement of this invention involves treatment with the prescribed catalysts of any predominantly phenol-containing material existing in the distillative recovery system after the acetone has been removed from the cleavage mixture, which itself is not effectively improved by the treatment. The predominantly phenol-containing material may be illustrated by the bottoms product from removal of acetone from the cleavage mixture, by the overhead crude phenol separated from higher boiling materials such as acetophenone and cumylphenol, by the bottoms product from steam distillation of a crude phenol, by the phenol stored prior to final batch distillation, and by the final product phenol isolated by batch or continuous distillation. These are all descriptive of materials obtainable in a substantially continuous distillation system, involving a series of columns, but comparable or related materials obtained by batchwise fractionation also may be treated. All of these materials may be defined as impure phenols to the extent that they contain genetic impurities as hereinbefore described. The purification process preferably comprises heating the impure phenol with the prescribed catalyst until the precursor-type genetic impurities have been completely reacted with the phenol and converted to alkyl-substituted benzofurans, and fractionally distilling, first with steam to remove the alkyl-substituted benzofurans as overhead, and then in the absence of water to collect a purified phenol-containing material.

The process in accordance with this invention is more particularly described in the following examples. In this specification all parts and percentages are by weight.

EXAMPLE 1

Cumene was oxidized to the hydroperoxide, and the hydroperoxide was subjected to acid cleavage. The acid catalyst in the cleavage mixture was removed from the latter by extraction with a concentrated aqueous solution of sodium sulfate. The extracted cleavage mixture was subjected to fractional distillation in a series of columns. In the first column acetone was taken overhead, leaving as bottoms product a mixture of phenol, some cumene and α-methylstyrene, and high boiling material composed primarily of acetophenone, dimethylphenylcarbinol and cumylphenol. This bottoms product was separated in the next column into an overhead crude phenol fraction and a high boiling residue. The crude phenol fraction was then subjected to steam distillation in a third column to remove overhead azeotropes of water with cumene and α-methylstyrene, and leave a crude phenol bottoms product.

The crude phenol bottoms product contained 17 parts per million of 2-methylbenzofuran (2-MBF), as determined by ultraviolet analysis, and it was dehydrated to reach a boiling point of 120° C. To it then was added 0.5% by weight of chromic chloride, and the resulting mixture was maintained at a temperature of 115°–120° C. for 30 hours, after which the 2-MBF content was 520 p.p.m. At the end of 50 hours, the amount of 2-MBF was 638 p.p.m.

A sample of the treated phenol was separated into two portions, one of which was subjected to ordinary batch distillation, with the charge being added to the still pot. The other portion was fractionally steam distilled using a modified inverted batch still technique, in which distilled water was charged to the still pot and brought to reflux, and then the treated phenol was pumped continuously into the top of the still while maintaining water reflux. Thus, all of the phenol was contacted with steam as it flowed down and across all of the trays of the column. After all the charge had been added, distillation was carried out in the normal manner.

The phenol obtained from each distillation was chlorinated according to the chlorination test set forth hereinafter. The phenol from ordinary distillation had a color of 21 absorbance units 540 m$\mu$, whereas that from steam distillation contained 12 p.p.m. 2-MBF and had a color of less than 1.0 absorbance until at 540 m$\mu$.

EXAMPLE 2

In this example there was used 0.5% mercuric chloride by weight based on the phenol, the mercuric chloride being in substitution for the chromic chloride of Example 1. Following the procedure of the latter, it was found that the treated phenol contained 354 p.p.m. 2-MBF after 30 hours of reaction, this value increasing to 370 p.p.m. in another ten hours at reaction temperature. After fractional steam distillation as in Example 1, the distilled phenol contained 8 p.p.m. 2-MBF and had a color on chlorination of less than 1.0 absorbance unit at 540 m$\mu$.

EXAMPLE 3

Duplication of Example 1 using cupric sulfate, cupric nitrate, cupric chloride, chromic nitrate, chromic sulfate, mercuric nitrate and mercuric sulfate in place of the chromic chloride gave steam distilled phenol products which in each instance were improved with respect to color on chlorination.

The effect of 2-methylbenzofuran, biacetyl and mesityl oxide upon the color of phenol which has been chlorinated is shown in the next example.

EXAMPLE 4

To samples of substantially pure phenol (Merck) were added varying amounts of mesityl oxide, biacetyl and 2-methylbenzofuran (2-MBF), and the resulting mixtures were chlorinated according to the chlorination test set forth hereinafter. A sample of the pure phenol was similarly chlorinated for comparative purposes. The data obtained are given in the following table.

Table

| Sample | Color on Chlorination Absorbance | |
|---|---|---|
| | 510 m$\mu$ | 540 m$\mu$ |
| Phenol | 0.28 | 0.10 |
| Phenol + 0.1% Mesityl Oxide | 1.2 | |
| Phenol + 0.2% Mesityl Oxide | 2.8 | |
| Phenol + 0.1% Biacetyl | 11.7 | |
| Phenol + 0.016% 2-MBF | | 7.3 |
| Phenol + 0.018% 2-MBF | | 9.7 |
| Phenol + 0.022% 2-MBF | | 12.6 |
| Phenol + 0.028% 2-MBF | | 14.8 |
| Phenol + 0.034% 2-MBF | | 15.8 |
| Phenol + 0.05% 2-MBF | | 22.8 |

The above data establish that each of the impurities has a profound effect on the color of chlorinated phenol. Both mesityl oxide and biacetyl cause a bright red coloration with a characteristic absorption at 510 m$\mu$. 2-methylbenzofuran is responsible for a reddish purple color with absorption at 540 m$\mu$, and it and biacetyl are relatively potent color-formers, imparting intense coloration in low concentration. By comparison, mesityl oxide causes considerably less coloration.

The effect of applying the process of this invention to any particular batch of phenol may be followed by using the following color tests for determining whether the precursor-type and alkyl-substituted benzofuran genetic impurities have been removed. Biacetyl gives a red color when the phenol is subjected to chlorination in the chlorination color test and gives a reddish amber color when the phenol is sulfonated in the sulfonation color test. 2-methylbenzofuran gives a reddish purple color when the phenol is chlorinated in the chlorination color test.

*Chlorination color test.*—10±0.1 g. phenol to be tested is placed in a chlorination vessel comprising a 25 mm. test tube fitted with a gas inlet tube extending to the bottom of the test tube, a gas outlet tube opening from the upper end of the test tube, and a glass stopper for introduction of the phenol. Chlorine gas is introduced through the gas inlet tube at a rate of one liter per minute while maintaining a reaction temperature at 80°±5° C. by cooling of the chlorination vessel. The chlorination vessel is weighed from time to time and chlorination is stopped when a gain in weight of 5.5–6.0 grams is noted. The chlorinated product is then transferred to a 1 cm. cell and subjected to analysis by a recording spectrophotometer. The absorption at 510 and 540 m$\mu$ is noted for test purposes and the position of maximum absorption is also noted. Absorbance is a measurement of the intensity of absorption and is defined as the log of the reciprocal of the transmittance. The color of the chlorinated phenol in a 1 cm. cell is alternatively analyzed by Lovibond color units.

*Sulfonation color test.*—10±0.1 g. phenol to be tested is placed in a sulfonation vessel and heated until molten. To the phenol is added 5 g. of concentrated sulfuric acid, and the resulting mixture is heated with stirring to 150° C. and held at that temperature for 5 minutes. The sulfonated phenol is then cooled and transferred to a 1 cm. cell and subjected to analysis by a recording spectrophotometer. The absorption at 485 m$\mu$ is noted for test purposes.

The process of this invention involves reaction between phenol and the alkyl-substituted benzofuran precursors to form alkyl-substituted benzofurans, and separation of the latter from the reaction mixture by efficient fractional steam distillation. The acidic catalysts which will effect the desired reaction are the halides, sulfates and nitrates of copper, chromium and mercury. The amount of catalyst required will vary, but will generally be in the range of about 0.005 to about 5% by weight based on the phenol-containing material being treated. A preferred range is from about 0.1 to about 1% by weight. The activity of the catalyst will, to a certain extent, determine the amount to be used, as will the length of time considered preferable to accomplish the desired result. Larger amounts of the less active catalysts will be needed, particularly when a comparatively short reaction period is needed from an operational standpoint. The catalytic treatment is desirably carried out for the length of time required to reach maximum content of alkyl-substituted benzofuran as determined by analysis.

The temperature of reaction may be anywhere from about 45° to about 200° C., a longer time being required at 45° C. than at higher temperatures in the range. A preferred temperature range is between about 100° and about 180° C. However, since it also may be preferred to operate under pressure, for example, 50 p.s.i., it is advantageous under such conditions to use temperatures as high as 190°-200° C. In general, as the temperature is increased, the rate of formation of 2-methylbenzofuran and other alkyl-substituted benzofurans also increases.

During the reaction period it may be desirable to have as little water present as is practical. Otherwise, it may be necessary to use a greater amount of catalyst than would be required under substantially anhydrous conditions, since water tends to decrease the activity of the catalysts. For example, mercuric nitrate has a tendency to hydrolyze with the formation of basic salts and should therefore be used under anhydrous conditions. On the other hand, the copper salts such as cupric sulfate are quite satisfactory in their activity with up to 15% water present based on the phenol-containing material treated.

Accordingly, the steam distillation step of the process of this invention should ordinarily not be combined with the period of catalytic reaction. Subsequent to the latter, however, the fractional steam distillation step is applied, and it must be operated with sufficient efficiency that the alkyl-substituted benzofurans such as 2-methylbenzofuran are substantially removed from the predominantly phenol-containing material. It is preferred that after the steam distillation the phenol-containing material will contain an amount of alkyl-substituted benzofuran corresponding to a content of 2-methylbenzofuran not exceeding about 50 parts per million, corresponding approximately to a chlorination color of about 3.0 at 540 m$\mu$. The steam distillation also should substantially remove mesityl oxide. These objectives can be accomplished by carrying out the distillation continuously in an efficient column, for example, one having 20-40 plates, or in a comparable column using the modified inverted batch technique described in Example 1. Ordinary batch steam distillation is comparatively ineffective.

The phenol-containing material from the steam distillation step then is preferably subjected to fractional distillation in the absence of water to collect a purified material which is free or substantially free of compounds which boil higher than phenol and remain as undistilled residue. For example, if the purified phenol is that obtained by applying the process of this invention to the bottoms product from removal of acetone from the cleavage mixture, the undistilled residue will principally comprise acetophenone, dimethylphenylcarbinol and cumylphenol. However, the purified phenol may contain, for example, some acetophenone and thus require further distillation to isolate a truly pure phenol. Some water also may be present, this also necessitating redistillation to remove last traces thereof so as to meet U.S.P. specifications in this respect. However, it is apparent that the phenol can be recovered, subsequent to the steam distillation step, by other procedures, such as extraction with aqueous alkali.

While the phenol to be purified by the process of this invention may contain from traces to comparatively large amounts of mesityl oxide, an alkyl-substituted benzofuran and one or more precursors of said alkyl-substituted benzofurans, the process is generally reserved for phenol containing no more precursor-type impurities and earlier formed alkyl-substituted benzofuran than will result in total alkyl-substituted benzofuran exceeding about 600 p.p.m. The maximum is based on economic factors rather than on effectiveness of the process and does not constitute a limitation to the process.

What I claim and desire to protect by Letters Patent is:

1. The method for the recovery of phenol from a cumene hydroperoxide cleavage mixture by fractional distillation, said mixture comprising phenol and acetone as principal components, which comprises subjecting said mixture to fractional distillation to remove acetone and then contacting in the liquid phase any substantially acetone-free, predominantly phenol-containing material, which material contains genetic impurities comprising mesityl oxide, an alkyl-substituted benzofuran, and at least one precursor of said alkyl-substituted benzofuran, under acidic conditions with an acidic catalyst selected from the group consisting of the halides, sulfates and nitrates of copper, chromium and mercury, at a temperature in the range of about 45° C. to about 200° C. until the precursor-type genetic impurity has substantially completely reacted with phenol and been converted to alkyl-substituted benzofuran, fractionally steam distilling the treated phenol-containing material until mesityl oxide and alkyl-substituted benzofuran have been substantially removed from said material and subsequently collecting a purified phenol-containing material.

2. The method of claim 1 in which the purified phenol-containing material is collected by fractional distillation in the absence of water to obtain a purified phenol fraction.

3. The method of claim 1 in which the temperature is between about 100° C. and about 180° C.

4. The method of claim 1 in which the catalyst is chromic chloride.

5. The method of claim 1 in which the catalyst is chromic sulfate.

6. The method of claim 1 in which the catalyst is mercuric chloride.

7. The method of claim 1 in which the catalyst is mercuric sulfate.

8. The method of claim 1 in which the catalyst is cupric sulfate.

References Cited in the file of this patent

UNITED STATES PATENTS

| | | |
|---|---|---|
| 2,446,250 | Shuman | Aug. 3, 1948 |
| 2,737,480 | Adams et al. | Mar. 6, 1956 |
| 2,757,209 | Joris | July 31, 1956 |
| 2,849,459 | Leary et al. | Aug. 26, 1958 |
| 2,971,893 | Hood | Feb. 4, 1961 |
| 2,992,169 | Gregory et al. | July 11, 1961 |

FOREIGN PATENTS

| | | |
|---|---|---|
| 1,231,070 | France | Sept. 26, 1960 |